United States Patent [19]

Baak

[11] Patent Number: 4,504,113
[45] Date of Patent: Mar. 12, 1985

[54] REINFORCED AND CHEMICALLY RESISTANT OPTICAL FILAMENT

[75] Inventor: Tryggve Baak, Carlsbad, Calif.

[73] Assignee: Schlumberger Technology Corporation, Houston, Tex.

[21] Appl. No.: 317,675

[22] Filed: Nov. 2, 1981

[51] Int. Cl.³ .................................................. G02B 5/14
[52] U.S. Cl. .............................. 350/96.33; 350/96.34
[58] Field of Search .............. 350/96.29, 96.30, 96.33, 350/96.34

[56] References Cited

U.S. PATENT DOCUMENTS

| | | | |
|---|---|---|---|
| 2,938,821 | 5/1960 | Nack | 154/2.24 |
| 3,013,888 | 12/1961 | Lajarte | 106/50 |
| 3,019,515 | 2/1962 | Whitehurst | 29/195 |
| 3,508,939 | 4/1970 | Laurent | 106/50 |
| 3,732,425 | 5/1973 | Ellert | 250/217 |
| 4,089,585 | 5/1978 | Slaughter | 350/96.23 |
| 4,118,211 | 10/1978 | Au Coin | 65/3 |
| 4,173,393 | 11/1979 | Maurer | 350/96.34 |
| 4,184,860 | 1/1980 | Schneider et al. | 350/96.3 X |
| 4,194,807 | 3/1980 | Gliemeroth | 350/96.31 |
| 4,209,229 | 6/1980 | Rittler | 350/96.34 |
| 4,213,672 | 7/1980 | Aulich | 350/96.23 |
| 4,243,298 | 1/1981 | Kao et al. | 350/96.33 |
| 4,319,803 | 3/1982 | Burmeister | 350/96.33 |
| 4,336,047 | 6/1982 | Pavlopoulos et al. | 65/3.31 |
| 4,402,720 | 9/1983 | Edahiro et al. | 65/3.12 |
| 4,407,561 | 10/1983 | Wysocki | 350/96.3 |

FOREIGN PATENT DOCUMENTS

| | | | |
|---|---|---|---|
| 34670 | 9/1981 | European Pat. Off. | 350/96.33 |
| 7602236 | 12/1976 | Netherlands | 350/96.33 |

OTHER PUBLICATIONS

Skaggs, *Rev. int. hautes Temper. Refract.*, vol. 16, France, 1979, "Zero and Low Coefficient of Thermal Expansion Polycrystalline Oxides," pp. 157-167.

*Primary Examiner*—William L. Sikes
*Assistant Examiner*—Frank González

[57] ABSTRACT

This invention relates to an improved optical filament waveguide providing increased strength and resistance to moisture and chemical attack. This improved optical filament waveguide is particularly useful in the severe environment encountered in wellbore logging operations. This optical filament waveguide is the result of coating, preferably at a temperature below 500° C., an optical filament rod with a relatively thin protective coating of a metal oxide whose coefficient of thermal expansion is of the same order of magnitude as that of the rod.

12 Claims, 4 Drawing Figures

REINFORCED AND CHEMICALLY RESISTANT OPTICAL FILAMENT

FIELD OF THE INVENTION

This invention relates to an improved optical filament waveguide having increased strength and resistance to moisture penetration and chemical attack. Such an improved optical filament is particularly useful and provides substantially enhanced service reliability when used as a communication link in fiber optical logging cables in wellbore logging operations.

DESCRIPTION OF THE BACKGROUND

Optical fiber waveguides have been used for communications systems. These optical waveguides are constructed of a transparent material such as glass. Waveguides comprise a center core surrounded by a cladding having an index of refraction less than the index of refraction of the core. Light propagates along the waveguide, being refracted within the core at its interface with the cladding. The theory of optical waveguides is well-known to those skilled in the art.

Long service life of optical waveguides requires high strength and durability. Chemicals, particularly water, may greatly affect the strength and durability of optical waveguides. Waveguides commonly comprise silicate glasses which are soluble in water. Surface cracks may appear and grow in silicate waveguides as the hydroxyl ion present in water attacks the silicon to oxygen bonds on the surface of the waveguide. These cracks result in deterioration of both the strength and the transmittance of the optical waveguide. When exposed to water or placed in an environment with a high moisture level, these cracks and the resulting deterioration of strength and transmittance grow with time. Thus, protection of the optical waveguide from contact with moisture and water is important. Various resin and plastic coatings have been used to protect optical waveguides from moisture.

When optical filament waveguides are used in wellbore logging operations, the severe environmental conditions encountered downhole greatly amplify the problems created by water. Further, resin and plastic coatings are permeable to water to some degree and are generally unsuitable for use in the high temperature, high pressure and highly corrosive downhole environment.

Extremely high pressures and temperatures may be encountered during wellbore logging applications. The solubility of silica in water increases as a function of temperature, pressure and pH. For example, at downhole pressures and temperatures of 15000 psi and 200° C., the solubility of silicon dioxide in water is 1280 parts per million. The equilibrium vapor pressure of water at 200° C. is 15.3 atmospheres. Optical filament waveguides comprising silica filaments are more susceptible to water and other chemical attack under these severe conditions of temperature and pressure.

Further, optical filament waveguides are generally used in stationary applications in most surface systems. When used in wellbore logging applications, the waveguides are subjected to extensive flexing in the logging cable. Movement of the waveguides and other cable components relative to one another also produces abrasion of the filaments. The abrasion and flexing produced by this movement also contribute to deterioration of both the durability and strength of the waveguide.

Resin and plastic coatings generally used for mechanical and chemical protection of waveguides for surface applications will not function properly in these severe conditions. Thus, it is desirable to provide an optical fiber waveguide with an impermeable coating which is resistant to moisture and other chemical attack and which will withstand the severe environmental conditions encountered in downhole operations. This protective coating should be particularly resistant to high pressures, to high temperatures and to the passage of water. This protective coating should also strengthen the optical filament.

SUMMARY OF THE INVENTION

The coating of an optical filament waveguide with a relatively thin protective layer of a material being resistant to both moisture and chemical attack and preferably having a coefficient of thermal expansion substantially equal to that of the optical filament waveguide provides a resistant optical filament capable of use in the severe environment of downhole wellbore logging operations. This optical filament has an excellent barrier to moisture and chemical attack, an increased strength and a resistance of compromise in the severe environment of downhole operations. This coating may be selected from various metal oxides and combinations thereof, or zirconia-containing glasses. When used with vitreous silica and silica containing optical fiber waveguides, the coating should preferably have a low coefficient of thermal expansion. The low coefficient of thermal expansion of the metal oxide or zirconia-containing protective layer, by acting in compression, contributes to the strength of the filament while providing improved resistance to moisture and chemical attack.

The various metal oxide coatings should be applied to the drawn filament at relatively low temperatures, preferably at temperatures below 500° C., to lessen stress created in the finished fiber. The zirconia-containing glass is applied to the outside of the preform at high temperatures prior to the final drawing of the resistant optical filament.

In another embodiment of the invention, the metal oxide coating may be applied to the drawn filament over the zirconia-containing glass coating to provide simultaneously the benefits of both coatings. Optionally, a further layer of a metal film, a resin or a plastic buffer may be applied to the optical filament waveguide to provide additional resistance to abrasion, mechanical stress, moisture and chemical attack. The use of an electrically conductive metal oxide protective layer, such as tin dioxide, permits the optional final protective metal, plastic or resin coating to be easily applied to the optical filament waveguide.

DESCRIPTION OF THE PREFERRED EMBODIMENT

Figure 1:
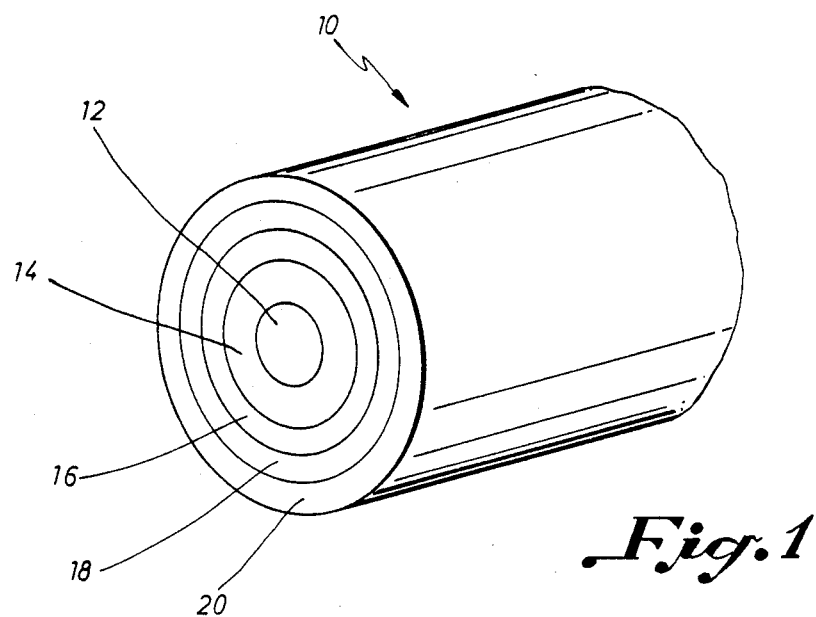
FIG. 1 shows the optical filament waveguide of this invention.
Figure 2:
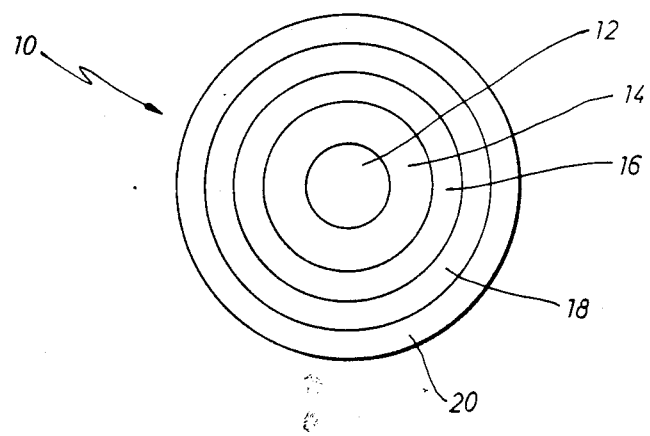
FIG. 2 is a cross-sectional view of the optical filament waveguide of FIG. 1.

The improved optical filament waveguide of the present invention is illustrated in FIGS. 1 and 2. The optical filament waveguide 10 comprises a rod transparent to a preselected range of electromagnetic radiation. The rod 10 comprises a central core 12 characterized by an index of refraction and a cladding 14 around its periphery having a different index of refraction. Alternatively, the index of refraction of the rod may change gradually from its central core to its periphery. Generally, the index of refraction of core 12 is higher than the index of refraction of periphery cladding 14. Such an optical filament waveguide will propagate electromagnetic radiation of the preselected wavelength along the longitudinal axis of the rod. The radiation of interest is generally the near infrared, although visible, infrared and ultraviolet radiation may be considered. Such a waveguide may be constructed of various silica, borosilica, zirconia-silica, germania-silica glasses and the like or even of certain plastics. The composition and methods of construction of such optical filament waveguides are well recognized by those skilled in the art. For example, a preform may be produced by depositing a glass of different refractive index, such as a silica-germania, boro-silica or zirconia-silica glass, on the inside of a silica tube or on the outside of a silica rod. Such a preform may then be drawn to produce the desired optical filament waveguide.

Hereinafter, the term "optical filament waveguide rod" is defined to be a rod transparent to a preselected range of electromagnetic radiation and having a first index of refraction in the core thereof and a different index of refraction at the periphery thereof such that the electromagnetic radiation will propagate along the longitudinal axis of the rod. Such "optical filament waveguide rods" are described in the immediately preceding paragraph.

The improved optical filament waveguide of the present invention further comprises a relatively thin protective coating 16 around the periphery of cladding 14 of the optical waveguide. The protective coating is selected from various metal oxides or zirconia-containing glasses, preferably exhibiting a coefficient of thermal expansion relatively near that of the optical waveguide. Such a coating should preferably have a coefficient of thermal expansion substantially equal to or less than that of the periphery of the transparent rod. When the coefficient of thermal expansion is less than that of the periphery of the transparent rod, the protective coating exerts a compressive force on the transparent rod. The coefficient of thermal expansion of vitreous silica which may form the rod is about $0.5 \times 10^{-6}/°C$. Materials with coefficients of thermal expansion as high as $10 \times 10^{-6}/°C$. would be expected to provide suitable protective coatings for vitreous silica rods. Preferably the coefficient of thermal expansion of the coating material should be lower than that of the optical filament waveguide rod in order to increase its strength by acting in compression.

The stable metal oxides of the Group IVA and Group IVB metals provide suitable protective coatings. The tetravalent oxides of tin, titanium, zirconium, hafnium and mixtures thereof produce particularly good protective coatings.

The coefficients of thermal expansion of these oxides and some of the double oxides are on the order of $10^{-6}/°C$. The coefficient of thermal expansion for the double orders varies as the mole ratio of one constituent to the other changes. Surprisingly, the coefficient of thermal expansion for some double oxide mole ratio is less than that of either constituent metal oxide alone. Thus, double oxides of certain mole ratio may produce excellent protective coatings, while either constituent metal oxide used alone would prove unsatisfactory. These metal oxides and double oxides may be particularly appropriate to produce protective coatings on silica based glass rods used as optical waveguides. Especially preferred is tin dioxide. Other polycrystalline metal oxides with low coefficients of thermal expansion may be found in Table II of the article by S. R. Skaggs, entitled "Zero and Low Coefficient of Thermal Expansion Polycrystalline Oxides," in *Rev. int. hautes Temper. Refract.*, Vol. 16, pp. 157–167 (1978) which is incorporated herein by reference.

The protective coating 16 should be applied with a relatively thin radial thickness as compared to the diameter of the transparent rod forming the waveguide. When applied in a thin layer, preferably with a radial thickness of no more than about 0.5 micrometer the protective coating will not create additional intolerable stress in the filament. Preferably the radial thickness of the protective coating will be less than the wavelength of the preselected light of interest but not less than about 0.01 micrometers in thickness. Normally the coating will be about 0.01 to about 0.02 micrometers in thickness.

Preferably the protective coating is applied to the rod at a temperature of less than about 500° C. Most preferably the coating is applied at temperatures where the deposition rate is relatively independent of temperature, such as 400° C.–500° C. for tin dioxide deposited from tin tetrachloride and oxygen. As the application temperature rises, the stress created in the finished filament increases. Thus, low temperature chemical vapor deposition techniques are preferred for application of the protective coating.

In another aspect of this invention the metal oxide, preferably zirconium dioxide may comprise part of a glass. Zirconia-containing glasses exhibit good resistance to moisture and chemical attack. Examples of such glasses include zirconia-silica, zirconia-silica-titania, zirconia-silica-alumina, zirconia-tin dioxide, zirconia-silica-tin dioxide and other zirconia containing glasses. These zirconia containing glasses may contain up to about six percent zirconium dioxide. These glasses may be used as the protective coating 16 and are subject to the same preferences on coefficients of thermal expansion and application thickness as stated above for the metal oxides.

The protective coating 16, whether comprising the metal oxide or the zirconia-containing glass is applied to the transparent optical waveguide rod by methods well recognized by those skilled in the art. The zirconia-containing glasses are applied to the preform at high temperatures prior to drawing of the resistant optical filament by conventional methods.

The preferred methods of applying the metal oxide coatings are those which permit a thin layer of the protective coating material to be deposited on the transparent rod continuously in the production process as the rod is being pulled from its preform. Such a method is advantageous in that the coating is applied to the newly formed clean rod, improving the adhesion of the coating to the rod. Especially preferred are techniques where the coating is applied at temperatures less than about 500° C.

Such methods of applying the metal oxide coatings may include vapor deposition of protective coating 16 on the periphery of cladding 14. Preferred means may include vaporizing the metal tetrahalide, such as tin tetrachloride at 500° C., and depositing a thin (e.g., as thin as 0.01–0.02 micrometers) layer 16 of metal dioxide, such as tin dioxide, on the rod surface 14. The diameter of rod 14 is generally about 125 micrometers. The tetrahalide may be the chloride, bromide or iodide, although the tetrachloride is preferred. Such a thin metal dioxide, such as the tin dioxide, layer increases the strength of the glass. It is presently believed that this increased strength results from the prevention of the development of Griffith cracks in the surface of the waveguide. A metal dioxide, preferably tin dioxide, layer also changes the frictional characteristics, decreases the scratch sensitivity and improves the hydrolytic durability of the optical fiber waveguide.

A zirconia-containing glass may be deposited by evaporating zirconium tetrachloride and silicon tetrachloride in the presence of the transparent waveguide preform and reacting with oxygen to form a zirconia-silica glass coating 16 on cladding 14. In another well-known method, a plasma spray of a suitable zirconia-containing mixture, such as a zirconia-silica glass may be applied to the preform.

In a preferred application method, the metal oxide coating is formed on the newly drawn rod 14 using a chemical vapor deposition technique. The hydrolysis of a halide of the chosen metal by water or hydrogen peroxide may be used. The tetrachloride, tetrabromide or tetraiodide of tin, titanium, zirconium or hafnium may be used. Preferably, tin tetraiodide, tin tetrabromide or tin tetrachloride may be hydrolyzed by water or hydrogen peroxide to deposit a layer of tin oxide on the rod. The hydrolysis rate increases with increasing atomic number of the halide. Hydrolysis temperatures as low as 200° C. may be used with tin tetraiodide. The reaction with hydrogen peroxide is more favorable than with water as long as the peroxide is stable. Up to about 400° C. the deposition rate with the peroxide is about two to three times that with water. The coating produced with hydrolysis using the peroxide has a smaller grain size.

Figure 3:
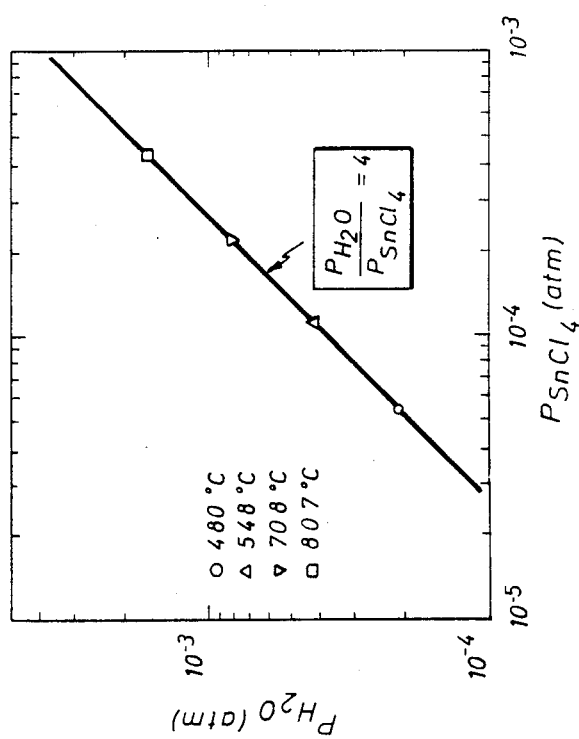
FIG. 3 is a graph of the relation between the tin tetrachloride vapor pressure and the water vapor pressure at various temperatures for an hydrolysis process to apply tin dioxide coating to an optical filament rod.

The reaction of tin tetrachloride and water may be explained by a Rideal-Eley mechanism where $B=4$. The ratio of the water vapor pressure to the tin tetrachloride pressure will be about 4 and will be independent of temperature. See FIG. 3. At temperature above about 400° C., the deposition rate for this reaction changes very little.

In a particularly preferred application method, a protective coating of tin dioxide is applied to the newly formed rod directly after it is drawn from the preform. Such a process is integrated with the drawing process and used at an economically high production rate. In this process, the newly drawn rod is exposed only to a clean, dry atmosphere until it reaches the reaction zone. This atmosphere may be dry oxygen at lower temperatures or dry nitrogen at higher temperatures. Under these conditions, water which causes loss of strength in the finished waveguide and poor adherence of the protective coating does not contact the newly drawn rod. Further, contact with dust and other atmospheric contaminants is eliminated, thus providing better adhesion. The application method must distribute the coating evenly around the rod.

Figure 4:
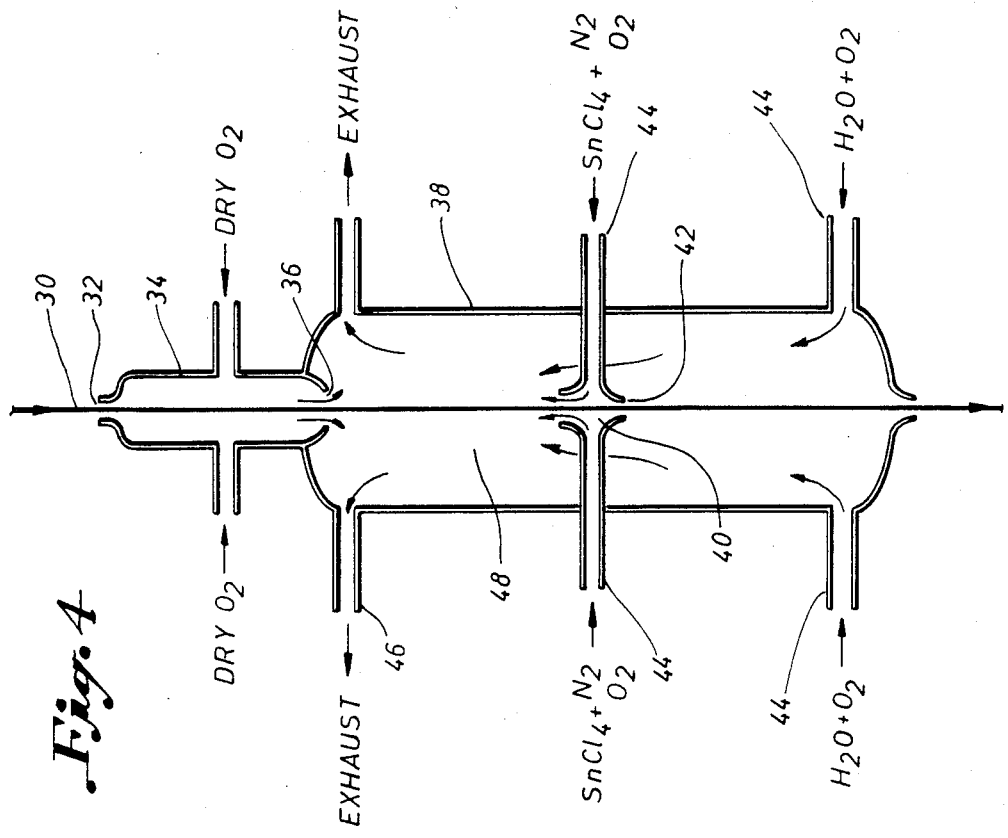
FIG. 4 is a representation of a possible reactor for coating optical filaments with tin dioxide.

The fiber coating reactor illustrated in FIG. 4 is used to coat rods with a metal oxide in a chemical vapor deposition process meeting the above specifications.

The reactor is so constructed that the newly drawn rod enters the vessel through a narrow opening 32 in a chamber 34 filled with dry oxygen. The oxygen has an overpressure so that no other gases from the zones above or below will intrude. The rod leaves the chamber through a slightly wider opening 36 promoting the flow direction downward of the oxygen. The rod enters the reaction chamber 38 and reaction zone 48 and passes through the "burner" 40 through which the tin tetrachloride flows. Either nitrogen or oxygen can be the carrying gas. Oxygen can be the carrying gas for both the water, or hydrogen peroxide and the tin tetrachloride, although tin tetrachloride reacts with oxygen at temperatures above 500° C. Conventional heating means, such as a tube furnace, is used to heat the reaction chamber to the desired temperature. The "burner" 40 is so constructed that the flow is mainly directed upward, where it reacts with the water or hydrogen peroxide in the reaction zone 48. The flow is concentric around the rod 30. A smaller portion of the tin tetrachloride may exit the more narrow lower opening 42 and react there, also coating the already formed tin dioxide film.

The reactor is so constructed that the rod does not contact any part of the reactor during its passage through the reactor for coating. The carrier gases and reactants flow through the reactor in a direction opposite to the direction of movement of the rod, with the rod passing the entrance port for the metal halide prior to passing the port for the water or hydrogen peroxide. As shown by arrows in FIG. 4, all gases preferably enter the system from opposing sides 44, promoting a symmetric flow pattern. This minimizes disturbance of the position of the rod in the center and promotes the flow pattern and even coating of the rod. Such gases may also enter the system from annular streams. Exhaust gases leave the reactor chamber at its upper end 46. Hydrogen chloride formed by the reaction is suitably absorbed by a sodium bicarbonate solution after exhausted from the reactor.

It has been found as was discussed earlier that the deposition rate above about 400° C. and at B values of 4 or greater is rather temperature independent. If the temperature region for the reaction is set to be below 500° C. the reaction vessel can be made of Pyrex which simplifies the construction of the reaction vessel.

The reactor is suitably surrounded by a split-type tube furnace. This makes service of the system convenient. The furnace extends over the whole reactor. The rod must reach reaction temperature before arriving at the reaction zone.

The index of refraction of protective coating 16 is not important and may be higher than the index of refraction of cladding 14 because protective coating 16 acts only as a protective coating and refraction of the propagated light does not occur in coating 16.

In another embodiment of the present invention both a zirconia-containing glass 16 and a metal oxide layer 18 may be successively applied to a transparent rod to produce an optical filament waveguide having two protective coatings. Such an arrangement provides the advantages and protection of both the zirconia-containing glass and the metal oxide, preferably tin dioxide, coatings.

The improved optical fiber waveguide described above may optionally be further protected by a standard resin, plastic or metal film layer 20 selected from materials and applied by methods known to those skilled in the art. Such materials must be capable of withstanding the severe environment, particularly the corrosive conditions, high temperatures and high pressures, encountered in downhole operations. Examples of useful metals include chromium and nickel. Such an optional additional protective layer 20 will provide additional mechanical and scratch protection for protective layer 16 or optional layer 18. Application of an electrically conductive metal oxide protective coating as layer 16 or layer 18 will permit optional layer 20 to be easily applied. The electrically conductive metal oxide will permit the deposit of an optional metal film 20 by the methods of electrodeposition, sputtering, ion plating, molten metal bath or the like. An optional plastic or resin buffer layer 20 may be applied with or without a coupling agent, such as silane. Such optional metal film, resin or plastic buffers and methods of application are known to those skilled in the art.

While the above is illustrative of what is now contemplated to be the best mode of carrying out the present invention, the resistant optical fiber of the present invention is subject to modification without departing from the true spirit and scope of the invention. For example, many zirconia-containing glasses which are resistant to water and moisture penetration in the severe environment of downhole operations may be used to provide the protective layer of the present invention on the optical fiber waveguide. Therefore, the invention is not restricted to the particular resistant optical waveguide illustrated and described, but covers all modifications which may fall within the scope of the following claims. It is applicant's intention in the following claims to cover such modifications and variations as fall within the true spirit and scope of the invention.

I claim:

1. An optical filament waveguide, comprising:
   a rod transparent to a preselected range of electromagnetic radiation and having a first index of refraction in the core thereof and a different index of refraction at the periphery thereof such that said electromagnetic radiation will propagate along the longitudinal axis of said rod; and
   a protective coating of a metal oxide having a coefficient of thermal expansion within about one order of magnitude of the coefficient of thermal expansion of the periphery of said rod and said protective coating being thin relative to the diameter of said rod.

2. The optical filament waveguide of claim 1, wherein said metal oxide comprises a polycrystalline double metal oxide selected from the group consisting of the zirconium-hafnium double oxides and the hafnium-titanium double oxides.

3. The optical filament waveguide of claim 1, wherein said metal oxide comprises a polycrystalline double metal oxide, and wherein the metals are selected from the group consisting of tin, titanium, zirconium and hafnium.

4. An optical filament waveguide, comprising:
   a rod transparent to a preselected range of electromagnetic radiation and having a first index of refraction in the core thereof and a different index of refraction at the periphery thereof such that said electromagnetic radiation will propagate along the longitudinal axis of said rod; and
   a thin protective coating of a metal oxide doped glass around the periphery of said rod, said coating having a coefficient of thermal expansion which is equal to or less than the coefficient of thermal expansion of the periphery of said rod.

5. The optical filament waveguide of claim 4, wherein said thin coating comprises zirconia compounds.

6. The optical filament waveguide of claim 4, further comprising a second thin protective coating of a metal oxide around the periphery of said first-mentioned protective coating.

7. The optical filament waveguide of claim 4, wherein said metal oxide protective coating comprises a polycrystalline double metal oxide.

8. An optical filament waveguide, comprising:
   a rod transparent to a preselected range of electromagnetic radiation and having a first index of refraction in the core thereof and a different index of refraction at the periphery thereof such that said electromagnetic radiation will propagate along the longitudinal axis of said rod;
   a thin protective coating of a zirconia-containing glass around the periphery of said rod, the radial thickness of said coating being thin relative to the diameter of said rod, and the coefficient of thermal expansion of said zirconia-containing glass being within about one order of magnitude of the coefficient of thermal expansion of the periphery of said rod, said protective coating providing better resistance to chemical attack by water and other corrosive chemicals and to mechanical attack by abrasion and stress than the periphery of said rod; and
   a second thin protective coating of a metal oxide around the periphery of said zirconia-containing glass, said metal oxide selected from the group consisting of tin dioxide, titanium dioxide, zirconium dioxide, hafnium dioxide, zirconium-hafnium double oxides and hafnium-titanium double oxides and said metal oxide coating being characterized by having a thin radial thickness relative to the diameter of said rod and by having a coefficient of thermal expansion being within about one order of magnitude of the coefficient of thermal expansion of said rod and said zirconia-containing glass.

9. An optical filament waveguide, comprising:
   a rod transparent to a preselected range of electromagnetic radiation and having a first index of refraction in the core thereof and a different index of refraction at the periphery thereof such that said electromagnetic radiation will propagate along the longitudinal axis of said rod;
   a thin protective coating of a zirconia-containing glass around the periphery of said rod having a coefficient of thermal expansion of said zirconia-containing glass equal to or less than the coefficient of thermal expansion of the periphery of said rod;
   a protective coating of a metal oxide around the periphery of said first-mentioned protective coating which comprises a polycrystalline double metal oxide.

10. An optical filament waveguide, comprising:
    a rod transparent to a preselected range of electromagnetic radiation and having a first index of refraction in the core thereof and a different index of refraction at the periphery thereof such that said electromagnetic radiation will propagate along the longitudinal axis of said rod;

a first protective coating of a zirconia-containing glass around the periphery of said rod; and a second thin protective coating of a metal oxide around the periphery of said first protective coating which comprises a polycrystalline double metal oxide.

11. An optical filament waveguide, comprising:

a rod transparent to a preselected range of electromagnetic radiation and having a first index of refraction in the core thereof and a different index of refraction at the periphery thereof such that said electromagnetic radiation will propagate along the longitudinal axis of said rod;

a first protective coating of a metal oxide doped glass around the periphery of said rod; and a second thin protective coating of a metal oxide around the periphery of said first protective coating which comprises a polycrystalline double metal oxide.

12. An optical filament waveguide comprising:

a rod trasnparent to a preselected range of electromagnetic radiation and having a first index of refraction in the core thereof and a different index of refraction at the periphery thereof such that said electromagnetic radiation will propagate along the longitudinal axis of said rod; and a thin protective coating of a zirconia-containing glass, comprising more than 5% by weight of zirconia compounds, around the periphery of said rod wherein said metal oxide protective coating comprises a polycrystalline double metal oxide.

* * * * *